(12) United States Patent
Manavi

(10) Patent No.: US 6,202,972 B1
(45) Date of Patent: Mar. 20, 2001

(54) COMBINATION AIR SPRING AND SHOCK ABSORBER

(75) Inventor: Bob Manavi, Toronto (CA)

(73) Assignee: Gabriel Ride Control Products, Inc., Brentwood, TN (US)

( * ) Notice: Subject to any disclaimer, the term of this patent is extended or adjusted under 35 U.S.C. 154(b) by 0 days.

(21) Appl. No.: 09/350,628

(22) Filed: Jul. 9, 1999

Related U.S. Application Data

(60) Provisional application No. 60/131,158, filed on Apr. 26, 1999.

(51) Int. Cl.[7] .................................................. F16M 13/00
(52) U.S. Cl. ......................... 248/421; 248/631; 248/636; 267/64.24; 267/131
(58) Field of Search .................................. 248/421, 631, 248/636, 562, 575, 588, 370, 398, 157, 133; 267/131, 117, 64.24; 297/344.16, 344.17

(56) References Cited

U.S. PATENT DOCUMENTS

| | | | |
|---|---|---|---|
| 3,608,855 | * | 9/1971 | Osenberg ............................... 248/400 |
| 3,628,763 | * | 12/1971 | Auer ...................................... 248/400 |
| 3,913,975 | * | 10/1975 | Carter .................................... 297/307 |
| 3,994,469 | * | 11/1976 | Swenson et al. ..................... 248/400 |
| 4,445,673 | * | 5/1984 | Clark .................................. 267/64.24 |
| 4,493,481 | * | 1/1985 | Merkle ............................... 267/64.27 |
| 4,809,944 | * | 3/1989 | Smith et al. .......................... 248/631 |
| 4,854,555 | * | 8/1989 | Ohkawa et al. .................... 267/64.24 |
| 5,004,206 | * | 4/1991 | Anderson .............................. 248/585 |
| 5,234,203 | * | 8/1993 | Smith .................................... 267/131 |
| 5,950,977 | * | 9/1999 | Proksch et al. ....................... 248/421 |

\* cited by examiner

Primary Examiner—Ramon O. Ramirez
Assistant Examiner—Tan Le
(74) Attorney, Agent, or Firm—McAndrews, Held & Malloy, Ltd.

(57) ABSTRACT

An improved seat suspension system including, in combination, an air spring and shock absorber, which comprise an air spring member and a shock absorber member, respectively. The air spring member and shock absorber member are longitudinally coupled to provide support and damping along a longitudinal axis. The air spring member and shock absorber member are coupled in a manner that enables them to be readily separated and independently serviced. A seat suspension also comprises a seat moveably coupled to a seat base that has a support structure. The combination air spring and shock absorber is interposed between the seat and the seat base to govern relative motion between the seat and the seat base. The combination air spring and shock absorber is rotationally coupled at each end to allow angular motion between the longitudinal axis of the combination air spring and shock absorber and the centerline of the seat. The combination air spring and shock absorber is positioned relative to the seat, seat base and support structure to provide momentless support and damping between the primary load-bearing area of the seat and the seat base.

2 Claims, 1 Drawing Sheet

COMBINATION AIR SPRING AND SHOCK ABSORBER

CROSS REFERENCE TO RELATED APPLICATIONS

This application is based on, and claims priority from, U.S. provisional patent application Ser. No. 60/131,158, filed Apr. 26, 1999, and titled "Seat Suspension Design", which provisional application is incorporated herein in its entirety by reference.

BACKGROUND OF THE INVENTION

The present invention relates generally to suspension systems. More specifically, the present invention relates to vehicle seat suspension systems.

Vehicle seat suspension systems are commonly used to increase rider comfort in vehicles. Low profile seats in automobiles typically include arrays of spring mechanisms for support, while high profile seats found in heavy trucks and buses offer room for more elaborate mechanisms.

Conventional seat suspension systems for high profile seats often include an air spring for providing load-bearing support and a shock absorber for providing damping support. Consider, for example, the conventional seat suspension system 100 illustrated in FIG. 1. The seat suspension system 100 includes a seat 110, a seat base 112 and a seat coupling 114 interposed between the seat 110 and the seat base 112. The seat coupling 114 may, for example, include a scissor support 115. An air spring 120 is interposed between the seat 110 and the seat base 112. The air spring 120 typically provides the primary load-bearing support for the seat 110, and thus is generally coupled to the seat 110 or seat coupling 114 at a position along the centerline 111 (or main load-bearing line) of the seat 110. Since the air spring 120 is generally flexible, it may be rigidly coupled at the lower end 122 and upper end 124 to the seat base 112 and the seat coupling 114 respectively.

The seat suspension system 100 also includes a shock absorber 130 for damping relative motions induced between the seat 110 and the seat base 112. The shock absorber 130 is typically coupled to the seat base 112 and seat coupling 114 at the lower shock end 132 and upper shock end 134 respectively. Since the air spring 120 typically occupies the space beneath the center of the seat 110, the shock absorber 130 is coupled to the seat 110 or seat coupling 114 at a position offset from the centerline 111 of the seat 110.

There are a number of disadvantages to the conventional seat suspension system 100, exemplified in FIG. 1, and other conventional seat suspension systems. One disadvantage is that since the shock absorber 130 is coupled to the seat coupling 114 at a position offset from the centerline 111 of the seat 110, the shock absorber 130 operates at a mechanical disadvantage. Thus, the shock absorber 130 is generally specified to provide more damping force than would be necessary if the shock absorber were more efficiently mounted. In addition, since the shock absorber 130 is providing damping force to the seat coupling 114 at a position offset from the centerline 111 of the seat 110, the damping force provided by the shock absorber 130 results in moments in the structure of the seat suspension system 100. The moments, in turn, induce twisting on the structure of the seat suspension system 100, leading to increased wear and reduced service life. The twisting, in turn, may also result in discomfort for the user of the seat suspension system 100.

Another disadvantage to the conventional seat suspension system 100 is that it is relatively expensive to manufacture. Two separate components, the air spring 120 and the shock absorber 130, govern the relative motion between the seat 110 and the seat base 130. Each of the two components, in turn, requires respective mounting hardware. Material supply lines must be managed for the air spring 120, shock absorber 130 and respective mounting hardware. The material supply lines may involve different suppliers. In addition, the relatively high part count complicates assembling the seat suspension system 100. Unnecessarily high part count typically corresponds to high production cost, reduced product reliability, increased production cycle time, and poorer overall product quality.

The need has long existed for an improved seat suspension system that provides increased user comfort, increased reliability, increased manufacturability, and reduced cost.

SUMMARY OF THE INVENTION

Accordingly, it is an object of the present invention to provide a seat suspension system which provides user support and damping along the centerline of the seat.

It is also an object of the present invention to provide a seat suspension system with a reduced parts count.

It is a further object of the present invention to provide a seat suspension system including a combination air spring and shock absorber.

It is a still further object of the present invention to provide a combination air spring and shock absorber for use in vehicle suspension systems.

One or more of the foregoing objects is met in whole or in part by a preferred embodiment of the present invention that provides an improved seat suspension system. The improved seat suspension system includes a seat coupled to a seat base with a scissors support. A combination air spring and shock absorber is interposed between the seat base and the seat to provide load support and damping to the seat. The combination air sp and shock absorber is rotationally coupled at a first end to the seat base, and rotationally coupled at a second end along the central rotational axis of the scissors support.

The combination air spring and shock absorber includes an air spring member with an axial cavity. The combination air spring and shock absorber also includes a shock absorber member which is substantially disposed in the axial cavity of the air spring member. The air spring member includes a first spring opening with a piston member sealingly engaging the outer cylindrical surface of the main shock body of the shock absorber member. The air spring member also includes a second spring opening with a cap member sealingly engaging the outer cylindrical surface of the shock rod of the shock absorber member. The combination air spring and shock absorber further includes a rod attachment member removeably coupled to the end of the shock rod extended through the cap member, which secures the air spring member to the shock absorber member. The air spring member and shock absorber member are slidably separable by the removal of the rod attachment member.

DETAILED DESCRIPTION OF THE PREFERRED EMBODIMENTS OF THE INVENTION

In the following detailed description, spatially orienting terms are used, such as "upper," "lower," "left," "right," "vertical," "horizontal," and the like. It is to be understood that these terms are used for convenience of description of the preferred embodiments by reference to the drawings. These terms do not necessarily describe the absolute location in space, such as left, right, upward, downward, etc., that any part must assume.

Figure 1:
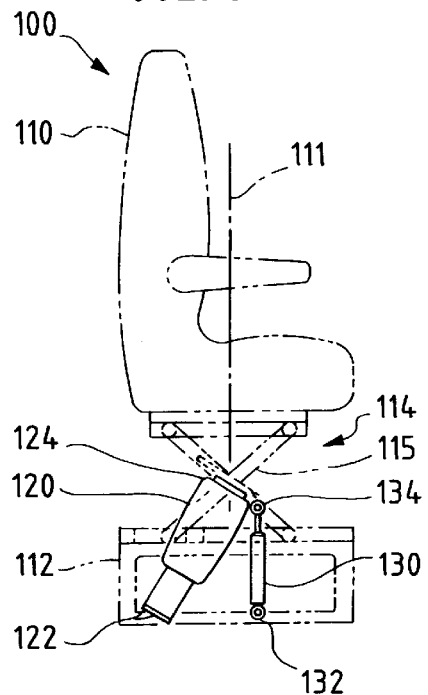
FIG. 1 illustrates a conventional seat suspension system.
Figure 2:
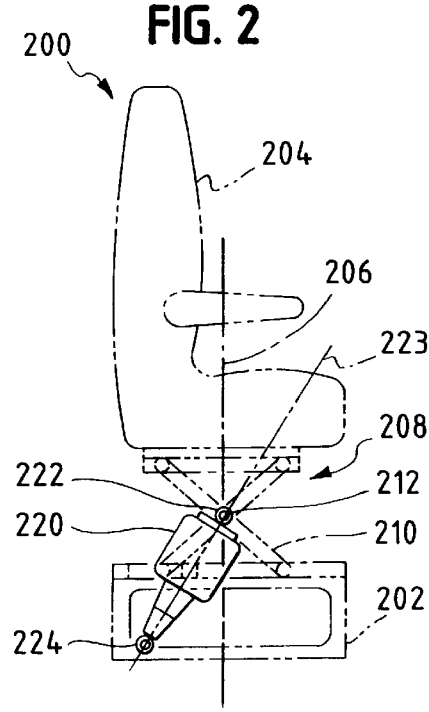
FIG. 2 illustrates a seat suspension system according to an embodiment of the present invention.

FIG. 2 illustrates a seat suspension system 200 according to an embodiment of the present invention. The seat suspension system 200 includes a seat base 202. The seat base 202 is typically a sturdy metal frame that serves as the foundation of the seat suspension system 200. The seat base 202 may, for example, be fixedly attached to a vehicle frame.

The seat suspension system 200 also includes a seat 204. The seat 204 is typically a vehicle seat of the type desirable for use in a heavy truck or bus and designed for long term user comfort. The seat 204 has a centerline 206, which is an imaginary line drawn vertically through the primary load-bearing area of the seat 204. Providing vertical support for the seat 204 along the centerline 206 minimizes seat twisting, which is detrimental to user comfort. Providing support for the seat 204 along the centerline 206 also minimizes moments within the seat suspension system 200, which effectively shorten the life of the seat suspension system 200.

The seat suspension system 200 further includes a support structure 208 interposed between the seat base 202 and the seat 204. The support structure 208 may, for example, comprise a scissor support 210, which is common in the industry. The scissor support 210 typically includes a left scissor interposed between the left side of the seat 204 and the left side of the seat base 202 and a right scissor interposed between the right side of the seat 204 and the right side of the seat base 202. The scissor support 210 includes a central rotational axis 212 extending horizontally between the primary rotational couplings of the scissor support 210. Referring to FIG. 2, the central rotational axis 212 for the scissor support 210 extends orthogonally from FIG. 2 at the point denoted by label 212. Alternatively, the support structure 208 may comprise a telescopic center support. A telescopic center support typically includes longitudinally slidingly coupled members which restrict horizontal movement of the seat 204 relative to the seat base 202 while allowing relative vertical motion between the seat 204 and the seat base 202.

The seat suspension system 200 includes a combination air spring and shock absorber 220 interposed between the seat 204 and the seat base 202. The combination air spring and shock absorber 220 is preferably coupled to support the seat 204 at a point along the centerline 206. For example, the combination air spring and shock absorber 220 may be rotationally coupled at a first end 222 to the scissor support 210 along the central rotational axis 212. Rotationally coupling the combination air spring and shock absorber 220 to the scissor support 210 enables angular displacement between the longitudinal axis 223 of the combination air spring and shock absorber 220 and the centerline 206, thereby reducing stress on the combination air spring and shock absorber 220.

The combination air spring and shock absorber 220 may be coupled (preferably rotationally coupled) at a second end 224 to the seat base 202. The location of the coupling between the second end 224 and the seat base 202 may be horizontally displaced relative to the centerline 206, depending on available space and the stroke length of the combination air spring and shock absorber 220. Coupling the combination shock absorber 220 to support the seat along the centerline 206 provides both load-bearing support and damping along the centerline 206 of the seat 204, which improves user comfort and extends the service life of the seat suspension system 200.

Figure 3:
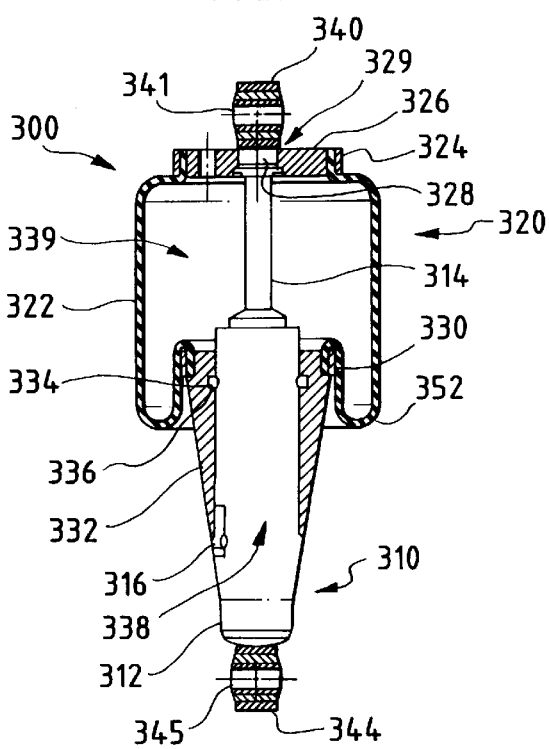
FIG. 3 shows a cutaway view of a combination air spring and shock absorber according to embodiment of the present invention.

For a cutaway view of a combination air spring and shock absorber 300 according to an embodiment of the present invention, refer to FIG. 3. The combination air spring and shock absorber 300 includes a shock absorber member 310. The shock absorber member 310, in turn, includes a shock main body 312 and a shock rod 314 extending longitudinally from the shock main body 312. The shock absorber member 310 may, for example, comprise a conventional hydraulic shock absorber.

The combination air spring and shock absorber 300 also includes an air spring member 320. The air spring member 320 comprises an air sleeve 322. The air sleeve is flexible, and may comprise, for example, a fabric reinforced rubber membrane. A first crimp ring 324 attaches the air sleeve 322 to a cap member 326. The cap member 326 includes a rod cap seal 328, which is sealingly coupled to the cap member 326. The cap member 326 and the rod cap seal 328 define a first spring opening 329. A second crimp ring 330 attaches the air sleeve 322 to a piston member 332. O-ring slots 336 in the piston member 332 contain an o-ring 334. The piston member 332 and the o-ring 334 define a second spring opening 338. The first and second crimp rings 324, 330 may be made from aluminum, the cap member 326 and piston member 332 may be made from glass reinforced plastic, and the rod cap seal 328 and o-ring 334 may be made from rubber.

The air sleeve 322, cap member 326, rod cap seal 328, piston member 332 and o-ring 334 define an axial spring cavity 339 that extends longitudinally through the air spring member 320. The shock absorber member 310 is substantially disposed in the axial spring cavity 339. The rod cap seal 328 slidingly and sealingly engages the outer cylindrical surface of the shock rod 314. The shock rod 314 may slide longitudinally through the first spring opening 329. However, the seal between the shock rod 314 and the rod cap seal 328 is preferably air-tight. The o-ring 334 slidingly and sealingly engages the outer cylindrical surface of the shock main body 312. The shock main body 312 may slide longitudinally through the second spring opening 338. However, the seal between the o-ring 334 and the outer cylindrical surface of the shock main body 312 is preferably air-tight.

The shock absorber member 310 includes a seat ridge 316 protruding from the shock main body 312, which interacts with the piston member 332 to inhibit the longitudinal motion of the shock main body 312 into the axial spring cavity 339 through the second spring opening 338. The combination air spring and shock absorber 300 includes a rod attachment member 340 which is removably coupled to a distal end of the shock rod 314 protruding through the first spring opening 329. The rod attachment member 340 may, for example, be threaded onto the end of the shock rod 314. Interaction between the rod attachment member 340 and the cap member 326 inhibits the longitudinal motion of the shock rod 314 into the axial spring cavity 339 through the first spring opening 329. The rod attachment member 340 preferably includes a first eye ring 341 for use in coupling the combination air spring and shock absorber 300 to an external device, such as, for example, the seat suspension system 200.

The combination air spring and shock absorber 300 includes a shock main body attachment member 344 which is coupled to the end of the shock main body 312 opposite the shock rod 314. The shock main body attachment member 344 preferably includes an second eye ring 345 for use in coupling the combination air spring and shock absorber 300 to an external device, such as, for example, the seat suspension system 200.

The shock absorber member 310 and the air spring member 320 are readily separable for independent service and repair. The removal of only the rod attachment member 340 from the end of the rod 314 is sufficient to enable separation between the shock absorber member 310 and the air spring member 320 by longitudinally sliding the shock absorber member 310 out of the axial spring cavity 339 through the second spring opening 338.

With the shock main body 312 inserted into the second spring opening 338 and the shock rod 314 inserted into the first spring opening 329, the axial spring cavity 339 is preferably air-tight. The air-tight axial spring cavity 339 is filled with pressurized air to provide load-bearing support. The cap member 326 includes a through-hole 350 into which an air fitting may be inserted whereby the air pressure inside the air spring member 320 may be controlled. The air pressure inside the air spring member 320 may be controlled by, for example, a conventional manual control valve or an automatic air pressure or seat height control system.

The air spring member 320, as illustrated in FIG. 3, is a rolling lobe air spring. During operation, slack in the air sleeve 322 is taken up or released from the rolling lobe 352 of the air sleeve 322. As the load being supported decreases or the air pressure inside the axial spring cavity 339 increases, the air pressure provides longitudinally outward force on the piston member 332 and the cap member 326. The piston member 332 and cap member 326, in turn, act on the shock main body 312 and the rod attachment member 340, respectively, to longitudinally extend the combination air spring and shock absorber 300. The rolling lobe 352 provides the air sleeve 322 slack needed by the air spring member 320 to longitudinally extend.

Conversely, as the load being supported increases, or the air pressure inside the axial spring cavity 339 decreases, the longitudinally outward forces caused by the air pressure on the piston member 332 and cap member 326 give way to longitudinally inward forces acting on the shock main body 312 and the rod attachment member 340. Thus the combination air spring and shock absorber 300 longitudinally contracts, and the rolling lobe 352 takes up the air sleeve 322 slack created in the contracted air spring member 320.

Figure 4:
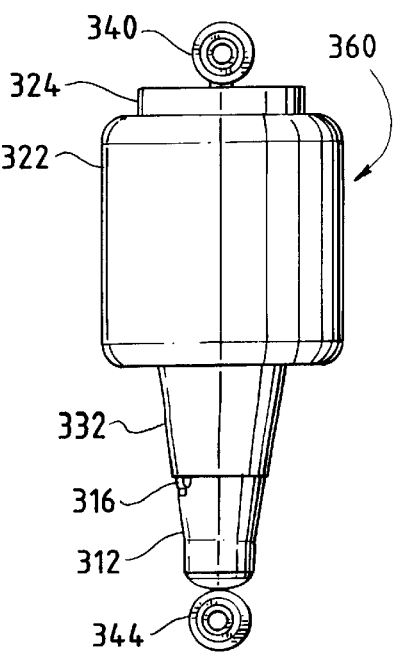
FIG. 4 shows an exterior view of a combination air spring and shock absorber according to an embodiment of the present invention.

Referring to FIG. 4, that figure illustrates an external view 360 of the combination air spring and shock absorber 300 illustrated in cut-away in FIG. 3. The external view 360 includes external views of the rod attachment member 340, the first crimp ring 324, the air sleeve 322 and the piston member 332. The external view 360 also includes external views of the seat ridge 316, the main shock body 312, and the shock main body attachment member 344.

The present invention provides an improved seat suspension system including a combination air spring and shock absorber. The improved seat suspension system provides increased rider comfort and increased reliability at a reduced cost. In addition, the improved seat suspension system is highly manufacturable and readily maintainable.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features, which come within the spit and scope of the invention.

What is claimed is:

1. A combination air spring and shock absorber comprising:
   an air spring member having an axial spring cavity extending longitudinally therethrough, the air spring member having a first spring opening and a second spring opening at opposite ends of the axial spring cavity;
   a shock absorber member substantially disposed in the axial spring cavity, the shock absorber member comprising a shock main body extending through the first spring opening and a shock rod extending from the shock main body and through the second spring opening and having an outer cylindrical surface;
   a rod attachment member removeably coupled to a distal end of shock rod, which extends through the second spring opening, the rod attachment member securing the air spring member to the shock absorber member such that the air spring member and the shock absorber member are slidably separable with the removal of said rod attachment member;
   a piston member that comprises a part of the air spring members, that defines the first spring opening and that engages the shock main body, the piston member interacting with the shock main body to inhibit longitudinal motion of the shock main body into the axial spring cavity through the first spring opening; and having an O-ring that slidingly and sealingly engages the main shock body to inhibit air flow through the second spring opening; and
   a cap member defining the second spring opening and longitudinally slidably engaging the outer cylindrical surface of the shock rod, the cap member interacting with the rod attachment member to inhibit longitudinal motion of the shock rod into the axial spring cavity through the second spring opening and comprising a rod cap seal which slidingly and sealingly engages the shock rod to inhibit air flow through the first spring opening.

2. The combination air spring and shock absorber of claim 1, wherein the shock main body further comprises a seat ridge extending radially from the shock main body and engaging the piston member, the seat ridge interacting with the piston member to inhibit longitudinal motion of the shock main body into the axial spring cavity through the first spring opening.

\* \* \* \* \*